(12) United States Patent
Shibasaki

(10) Patent No.: US 8,564,694 B2
(45) Date of Patent: Oct. 22, 2013

(54) IMAGE PICKUP DEVICE AND NOISE REDUCTION METHOD THEREOF

(75) Inventor: Tetsuya Shibasaki, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 537 days.

(21) Appl. No.: 12/922,522

(22) PCT Filed: Jan. 14, 2010

(86) PCT No.: PCT/JP2010/000170
§ 371 (c)(1),
(2), (4) Date: Sep. 14, 2010

(87) PCT Pub. No.: WO2010/087116
PCT Pub. Date: Aug. 5, 2010

(65) Prior Publication Data
US 2011/0013068 A1  Jan. 20, 2011

(30) Foreign Application Priority Data
Jan. 30, 2009  (JP) .................................. 2009-019393

(51) Int. Cl.
*H04N 5/217* (2011.01)
*H04N 5/335* (2011.01)

(52) U.S. Cl.
USPC .......................................... 348/241; 348/311

(58) Field of Classification Search
USPC ................. 348/294, 298, 303–305, 311–324, 348/241–252; 382/254, 266, 274, 275
See application file for complete search history.

(56) References Cited

U.S. PATENT DOCUMENTS

| 5,089,894 | A | * | 2/1992 | Higashitsutsumi | 348/249 |
| 5,781,234 | A | * | 7/1998 | David et al. | 348/319 |
| 5,923,370 | A | * | 7/1999 | Miethig et al. | 348/320 |
| 6,339,213 | B2 | * | 1/2002 | Harada | 250/208.1 |
| 2007/0153103 | A1 | * | 7/2007 | Shibasaki | 348/241 |
| 2008/0170138 | A1 | * | 7/2008 | Shibasaki | 348/241 |

FOREIGN PATENT DOCUMENTS

| JP | 2301270 | 12/1990 |
| JP | 2008124886 | 5/2008 |
| JP | 2008177709 | 7/2008 |

OTHER PUBLICATIONS

Office Action dated Mar. 28, 2013 issued in corresponding Japanese application No. 2009-019393.

\* cited by examiner

*Primary Examiner* — Aung S Moe
(74) *Attorney, Agent, or Firm* — Bacon&Thomas, PLLC

(57) ABSTRACT

There is provided an image pickup device capable of reducing noises, e.g., smears outputted from a CCD without using a special light amount adjusting device regardless of pixel defects. The image-pickup device includes a CCD having an image-pickup area and a storage area; a control unit for vertical-transferring signals of a line number having no pixel signal from a vertical-transfer register of the storage area and vertical-transferring more lines than the line number of a vertical-transfer register of the image-pickup area by the line number to the vertical-transfer register of the storage area during a period; an image signal obtaining unit for obtaining first image signals outputted from predetermined pixels of the CCD; an obtaining unit for obtaining the second image signals of the line number having no pixel signal of the storage area; and a correction unit for subtracting the second image signal from the first image signals.

10 Claims, 11 Drawing Sheets

IMAGE PICKUP DEVICE AND NOISE REDUCTION METHOD THEREOF

FIELD OF THE INVENTION

The present invention relates to an image pickup device, such as a television camera or the like, having a charge coupled device; and, more particularly, to a method for reducing noises such as a smear and the like which are included in an image signal outputted from an electron multiplying-charge coupled device.

BACKGROUND OF THE INVENTION

A conventional image pickup device having a charge coupled device obtains smear signals outputted from an optical black area where pixels are light-shielded, calculates an average value of the smear signals per line by averaging the smear signals for each column of lines and subtracts the average value from image signals outputted from a predetermined pixel of the charge coupled device, to thereby reduce noises such as smears and the like which are included in the image signals outputted from the charge coupled device.

Moreover, the charge coupled device is controlled not to transmit image signals of predetermined lines in its image pickup area and to output a smear signal for allowing the non-transmitted lines to serve as signal lines of a black level, to thereby reduce noises such as smears and the like (see, e.g., Japanese Patent Application Publication No. 2008-177709 and C246CYMBO 680×500 PIXEL IMPACTRON™ COMPLEMENTARY COLOR CCD IMAGE SENSOR SOCS089-MAY 2005 manufactured by TI).

However, in the aforementioned prior art, the smear signals are obtained from the light-shielded optical black area. Accordingly, it is difficult to accurately calculate an average value due to pixel defects which are latently included in the light-shielded optical black area when the outputted smear signals are averaged for each column of lines. Therefore, it becomes difficult to accurately correct smears.

Further, since a portion of the image pickup area becomes a quasi-optical black area, the image pickup area is reduced. Besides, in case that the charge coupled device has many light-shielded optical black areas, this restricts to making the quasi-optical black.

SUMMARY OF THE INVENTION

In view of the above, the present invention provides an image pickup device, capable of reducing noises such as smears and the like outputted from a charge coupled device without using a special light amount adjusting device regardless of pixel defects by obtaining a smear signal from an area free from pixel defects in the charge coupled device.

An image pickup device of the present invention includes: a charge coupled device having an image pickup area and a storage area; a control unit for vertical-transferring signals of a predetermined line number that have no pixel signal from a vertical transfer register of the storage area and vertical-transferring more lines than the number of lines of a vertical transfer register of the image pickup area by the predetermined line number to the vertical transfer register of the storage area during a vertical blanking period; an image signal obtaining unit for obtaining image signals outputted from predetermined pixels of the charge coupled device as a first image signal; an obtaining unit for obtaining the signals of the predetermined line number that have no pixel signal of the storage area as a second image signal; and a correction unit for subtracting a value corresponding to the second image signal obtained by the obtaining unit from the first image signal obtained by the image signal obtaining unit.

The image pickup device may further include a calculation unit for calculating an inter-line average value or an inter-line central value of the second image signal obtained by the obtaining unit; a suppression unit for performing a high-level suppression on the signal calculated by the calculation unit; and a subtractor for subtracting the signal suppressed by the suppression unit from the first image signal obtained by the image signal obtaining unit.

The image pickup device may further include a comparison unit for comparing the second image signal calculated by the calculation unit with a predetermined level; and a switching unit for cutting off an output of the suppression unit depending on a comparison result of the comparison unit.

In accordance with the present invention, a noise reduction method of an image pickup device including a charge coupled device having an image pickup area and a storage area, includes vertical-transferring signals of a predetermined line number that have no pixel signal from a vertical transfer register of the storage area and vertical-transferring more lines than the number of lines of a vertical transfer register of the image pickup area by the predetermined line number to the vertical transfer register of the storage area during a vertical blanking period; obtaining image signals outputted from predetermined pixels of the charge coupled device as a first image signal; obtaining the signals of the predetermined line number that have no pixel signal of the storage area as a second image signal; and subtracting a value corresponding to the second image signal obtained by the obtaining unit from the first image signal obtained by the image signal obtaining unit.

The noise reduction method may include performing an inter-line averaging process on the obtained signal; and performing a high-level suppression on the averaged signal based on the electron multiplication factor; obtaining an image signal outputted from the pixel other than the predetermined pixel of the electron multiplying-charge coupled device; and subtracting the suppressed signal from the obtained image signal.

The noise reduction method may include comparing a level of the averaged signal with a specified level; and subtracting the suppressed signal from the image signal depending on a comparison result.

In accordance with the present invention, by typically (normal speed) vertical-transferring predetermined lines in a storage area of a charge coupled device; high-speed vertical-transferring more lines than the number of lines in an image pickup area by a predetermined line number; and typically vertical-transferring fewer lines than the number of lines in the image pickup area by a predetermined line number, the smear signal is obtained without image signals from pixels from the image pickup area of the charge coupled device as a quasi-optical black area. Further, a suppression is performed on the obtained smear signal depending on an image signal level of a pixel in a predetermined area, and the suppressed smear signal is subtracted from the image signal level. Accordingly, it is possible to obtain an image signal with noises such as a smear signal and the like, reduced regardless of pixel defects which are latently included in the light-shielded optical black.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiments of the present invention will now be described with reference to the accompanying drawings which form a part hereof.

Figure 1:
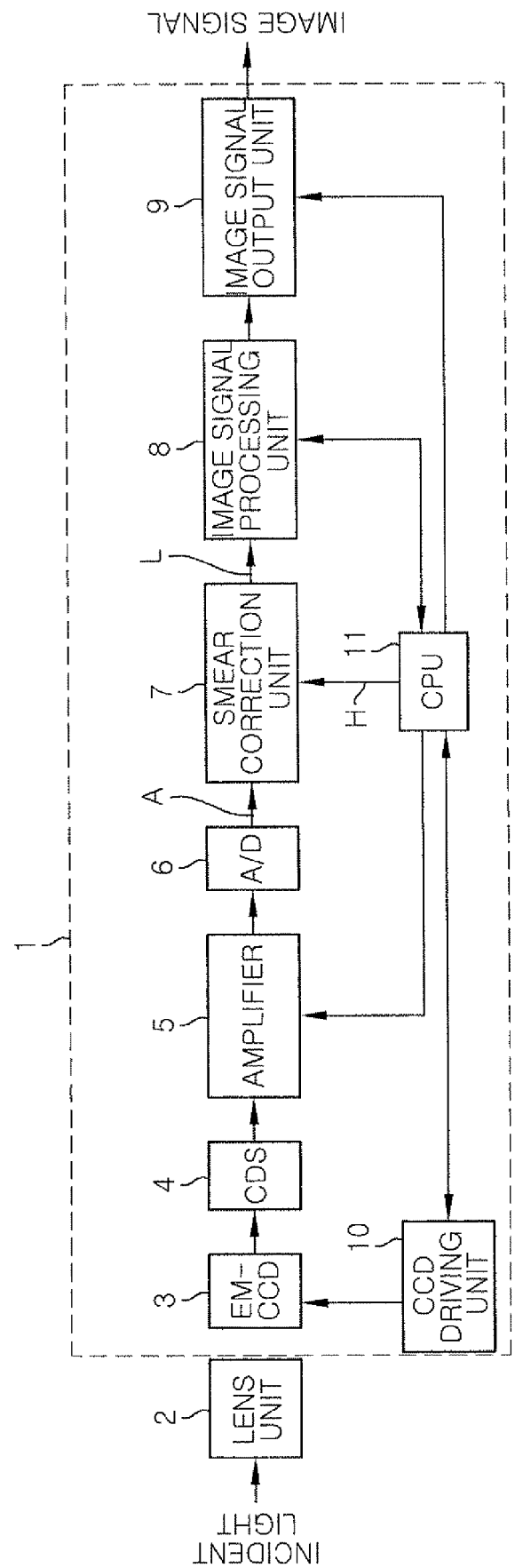
FIG. 1 is a block diagram showing an image pickup device in accordance with an embodiment of the present invention.

First, an image pickup device in accordance with an embodiment of the present invention will be described with reference to FIGS. 1 and 2. FIG. 1 is a block diagram showing the image pickup device in accordance with the embodiment of the present invention.

In FIG. 1, reference numeral 1 indicates an image pickup device, reference numeral 2 denotes a lens unit for forming an image of incident light, reference numeral 3 is an electron multiplying-charge coupled device (EM-CCD) for converting a light introduced from the lens unit 2 into an electric signal, and reference numeral 4 denotes a correlated double sampling (CDS) unit for eliminating noises from the signal outputted from the EM-CCD 3.

In addition, reference numeral 5 indicates an amplifier unit for adjusting a gain of a signal outputted from the CDS unit 4, reference numeral 6 is an A/D converter (analog digital converter) for converting an analog signal outputted from the amplifier unit 5 into a digital signal A, and reference numeral 7 denotes a smear correction unit for detecting and correcting a noise signal such as smear and the like outputted from the EM-CCD 3.

Reference numeral 8 is an image signal processing unit for performing various image processings on a signal L outputted from the smear correction unit 7, reference numeral 9 denotes an image signal output unit for converting a signal outputted from the image signal processing unit 8 into an image signal of a predetermined type to output the image signal, reference numeral 10 indicates a CCD driving unit for driving the EM-CCD 3 and performing gain control of the electron multiplication, and reference numeral 11 denotes a CPU (Central Processing Unit) for controlling each unit of the image pickup device 1. Further, the CPU 11 controls the smear correction unit 7 by a signal H.

The image signal of the predetermined type that is outputted from the image signal output unit 9 is a motion image or a still image of, e.g., a National Television System Committee (NTSC) type, a Phase Alternating by Line (PAL) type, a High Definition TeleVision (HDTV) type or the like.

Figure 2:
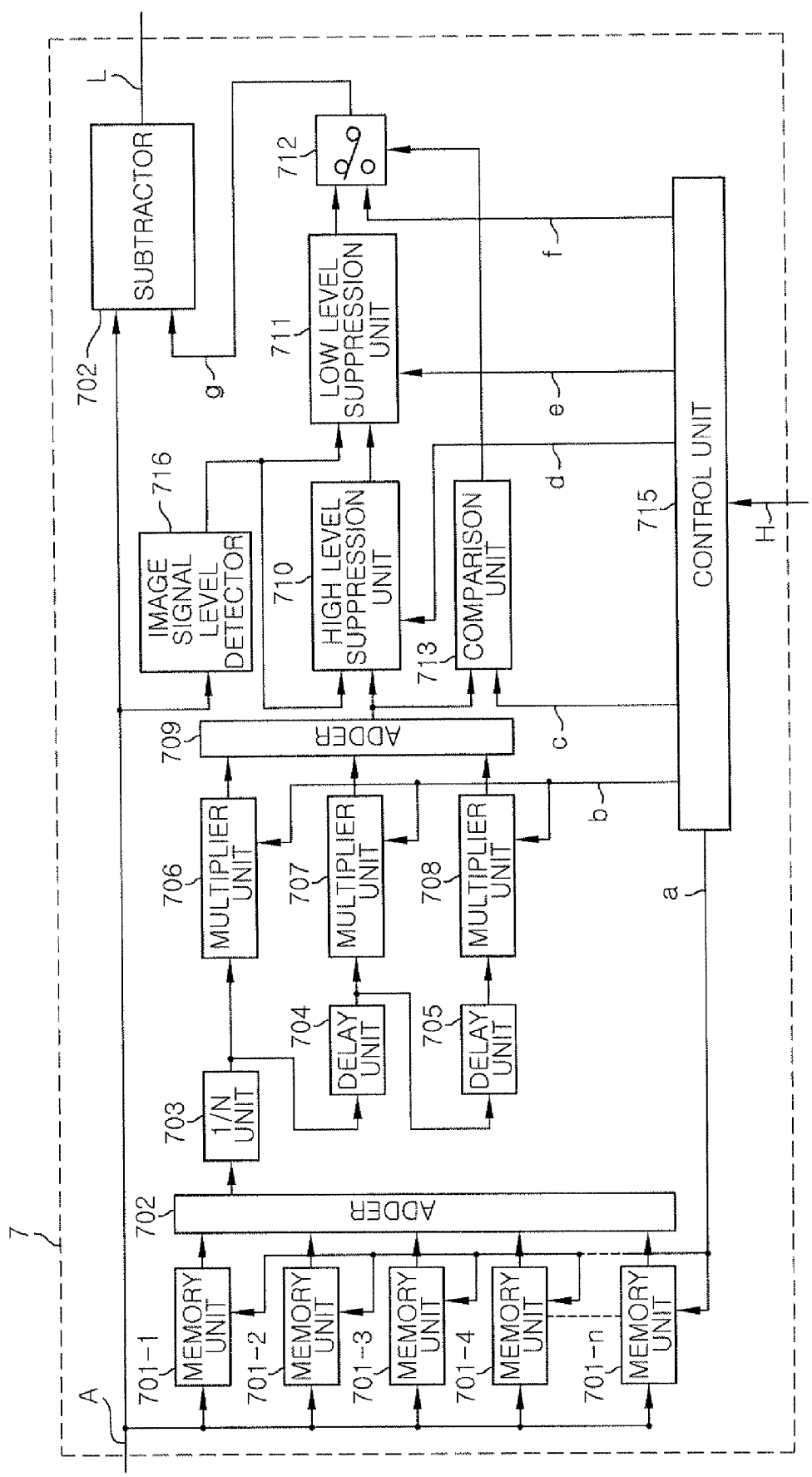
FIG. 2 is a block diagram showing a smear correction unit in accordance with the embodiment of the present invention.

FIG. 2 is a detailed block diagram showing the smear correction unit 7 in FIG. 1.

In FIG. 2, reference numerals 701-1 to 701-n (n is a natural number) denote memory units, each for storing digital signals corresponding to a single scanning line (1H). Reference numeral 702 indicates an adder for adding output signals from the memory units 701-1 to 701-n, and reference numeral 703 is a 1/n unit for multiplying an output signal from the adder 702 by 1/n. Reference numerals 704 and 705 denote delay units each of which delays an input signal by a delay time corresponding to a single pixel, reference numerals 706 to 708 are multiplier units, each for multiplying an input signal by a predetermined multiplication factor and reference numeral 709 denotes an adder for adding output signals from the multiplier units 706 to 708. Reference numeral 710 indicates a high-level suppression unit for applying a predetermined suppression to a signal equal to or higher than a predetermined level, that is outputted from the adder 709, and reference numeral 711 denotes a low-level suppression unit for applying a predetermined suppression to a signal equal to or lower than a predetermined level, that is outputted from the high-level suppression unit 710.

Further, reference numeral 713 indicates a comparison unit for comparing a level of the signal outputted from the adder 709 with a predetermined signal level, reference numeral 712 denotes a switching unit for switching an output signal depending on a comparison result that is outputted from the comparison unit 713, and reference numeral 714 is a subtractor for subtracting a signal g from the signal A. Reference numeral 715 denotes a control unit for outputting signals a, b, c, d, e and f depending on the input signal H. Reference numeral 716 is an image signal level detector for detecting, from the signal A, an average level of, e.g., a single frame or field of an image signal outputted from pixels of an image pickup area other than a smear signal detection area, which will be described later.

An operation in accordance with the embodiment of the present invention will now be described with reference to FIG. 1.

The EM-CCD 3 of the image pickup device 1 photoelectrically converts the incident lights imaged on the photoelectric conversion units by the lens unit 2 into electric signals and outputs the converted electric signals to the CDS unit 4. The CDS unit 4 removes noises from the signals outputted from the EM-CCD 3 and outputs resultant signals to the amplifier unit 5. The amplifier unit 5 amplifies the signals outputted from the CDS unit 4 depending on a gain control signal outputted from the CPU 11 and outputs the amplified signals to the A/D converter 6. The A/D converter 6 converts the analog signals outputted from the amplifier unit 5 into digital signals of, e.g., 10 bits and outputs the digital signals A to the smear correction unit 7.

The smear correction unit 7 detects and corrects the smear signal originated from the EM-CCD 3, and outputs the signal L to the image signal processing unit 8. Further, the image signal processing unit 8 performs various image processes on the signals L outputted from the smear correction unit 7 and outputs resultant signals to the image signal output unit 9. The image signal output unit 9 converts the signals outputted from the image signal processing unit 8 into image signals of the predetermined type and then outputs them. The CCD driving unit 10 outputs a signal for driving the EM-CCD 3 based on a control signal outputted from the CPU 11. Further, the CPU 11 outputs the signal H for controlling the smear correction unit 7.

The CCD driving unit 10 transmits to the CPU 11 position information of the pixel read out by the EM-CCD 3. Alternatively, the CPU 11 may instruct to the CCD driving unit 10 a reading start point of the signal outputted from the EM-CCD 3. Depending on the image signal outputted from the image signal processing unit 8, the CPU 11 outputs a signal for controlling an amplification factor to the amplifier unit 5 and a signal for performing the gain control on electron multiplication in the EM-CCD 3 to the CCD driving unit 10. Moreover, the CPU 11 sends to the control unit 715 the signal H with the position information of the pixel read out by the EM-CCD 3 and the gain ratio information on the electron multiplication in the EM-CCD 3, and the signals a, b, c, d, e, and f are outputted from the control unit 715 based thereon.

Next, the smear will now be described. The smear refers to a blur phenomenon of the light that appears above and below spotlight when the spotlight, i.e., a high-luminance object is photographed by the charge coupled device. The smear occurs even in the illuminance equal to or less than the saturated illuminance of the charge coupled device. Further, the smear is proportional to the illuminance of the photographing light. The smear affects all pixels disposed in the vertical direction passing through the pixel photographing the spotlight.

Figure 6:
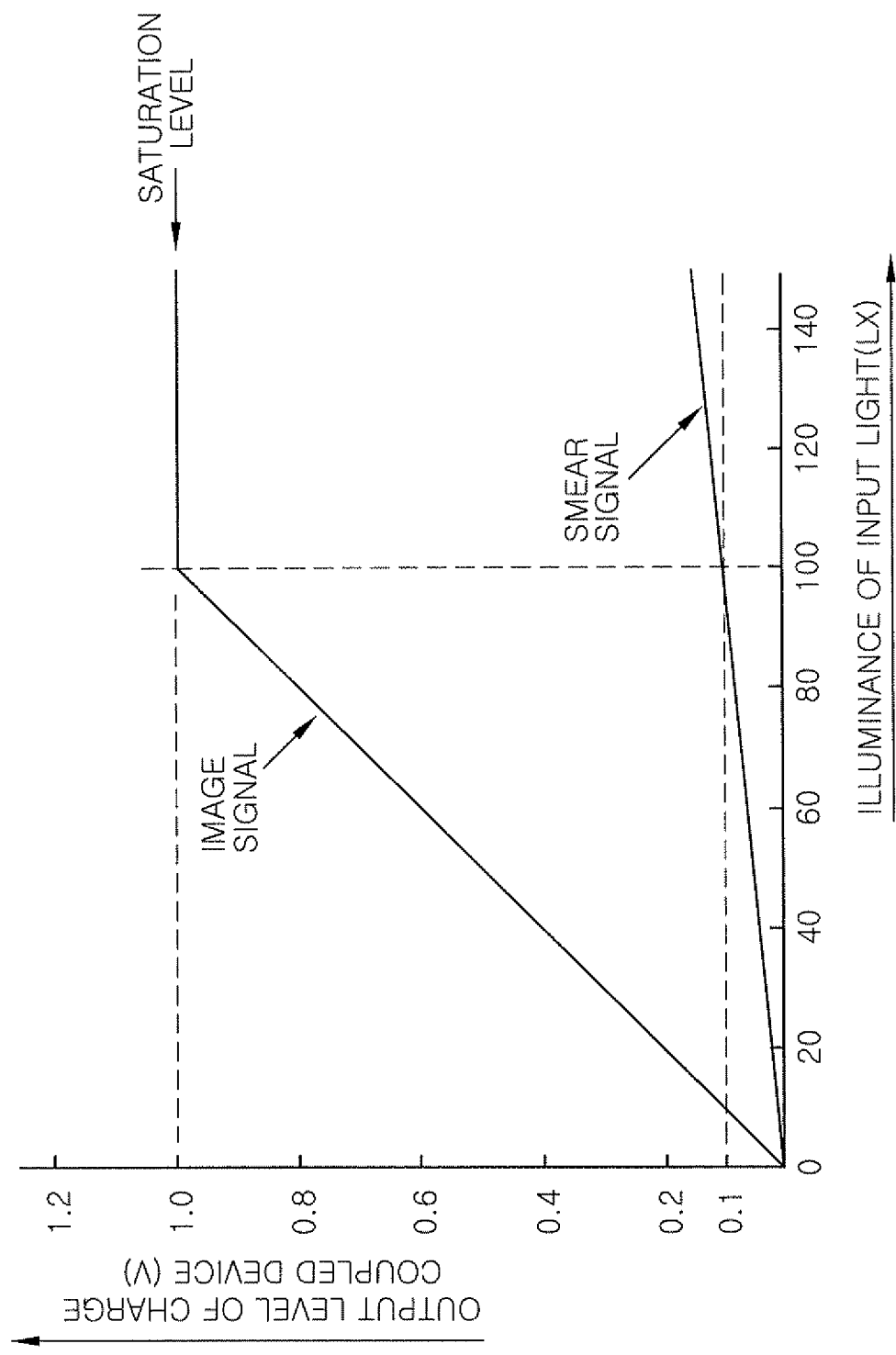
FIG. 6 is a view for explaining a relationship between a smear signal and an image signal outputted from the charge coupled device.

FIG. 6 shows an example for explaining a relationship between the smear signal and the image signal outputted from the charge coupled device. The image signal of the charge coupled device is saturated at the incident light illuminance of 100 lux and an output saturation level of the charge coupled device is 1.0 V. The smear signal is 10% of the image signal, but it still increases even after the image signal is saturated.

Figure 7:
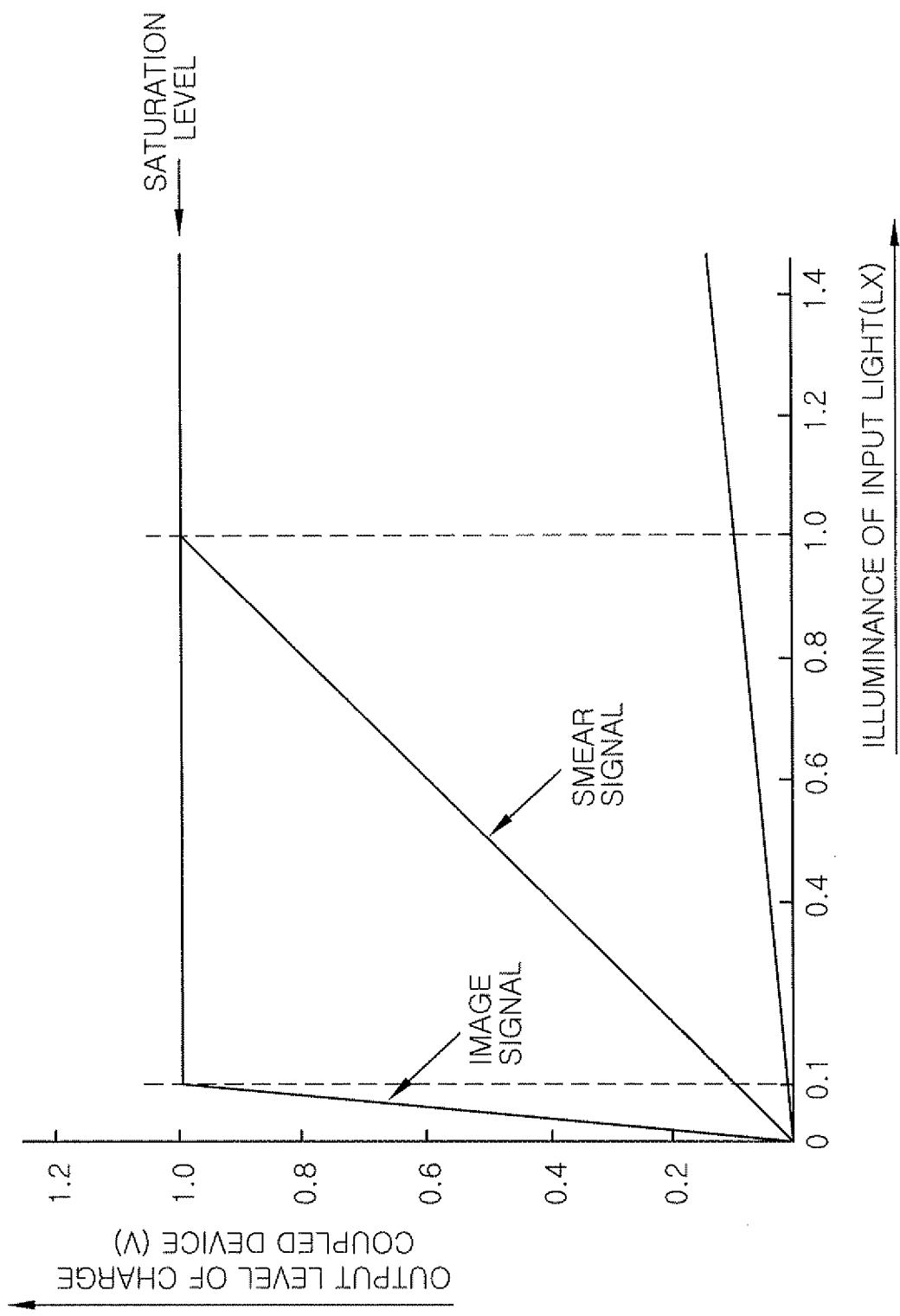
FIG. 7 is a view for explaining a relationship between a smear signal and an image signal outputted from an electron multiplying-charge coupled device.

FIG. 7 shows an example for explaining a relationship between the smear signal and the image signal outputted from an electron multiplying-charge coupled device when a charge coupled device shown in FIG. 6 is of the electron multiplying type and the electron multiplication factor is set to 1000 times. The image signal of the electron multiplying-charge coupled device is saturated at the incident light illuminance of 0.1 lux, and the saturation level is 1.0 V. Further, the smear signal is 10% of the image signal, but the smear signal increases even after the image signal is saturated. However, the smear signal is also saturated at 1.0 lux.

In the present embodiment, based on such characteristics of the smear, the smear signal correction is carried out by detecting a smear signal from a quasi-optical black area equivalent to an area where pixels are light-shielded; and subtracting the smear signal from the image signal obtained by photoelectrically converting an incident light.

Figure 8:
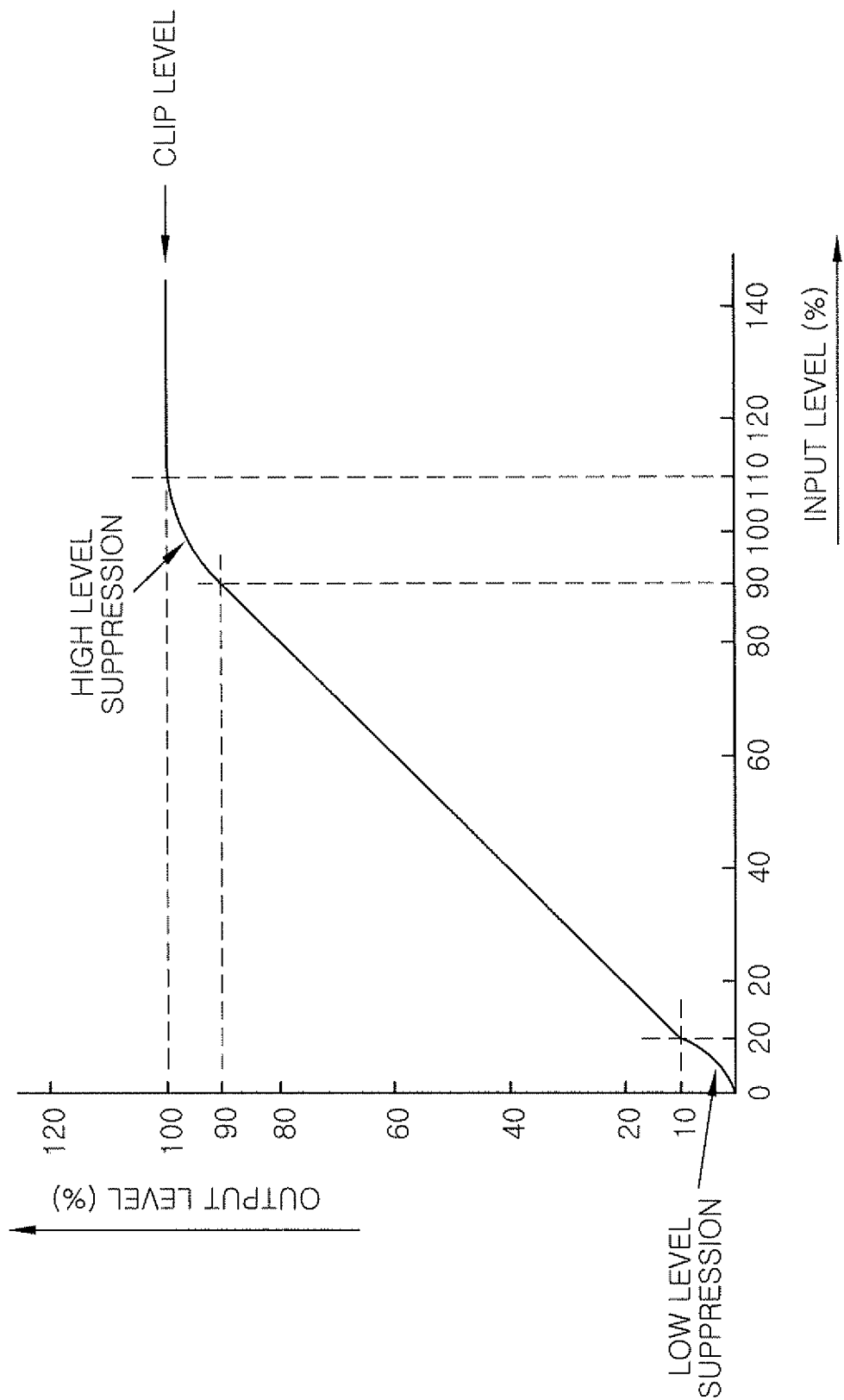
FIG. 8 is a view for explaining low-level and high-level suppressions of a smear correction signal in accordance with the embodiment of the present invention.

The operations of detection and correction of a smear signal outputted from the EM-CCD 3 in accordance with the embodiment of the present invention will now be described with reference to FIGS. 2 to 8. FIG. 8 is a view for explaining low-level and high-level suppressions of a smear correction signal in accordance with the embodiment of the present invention.

Figure 3:
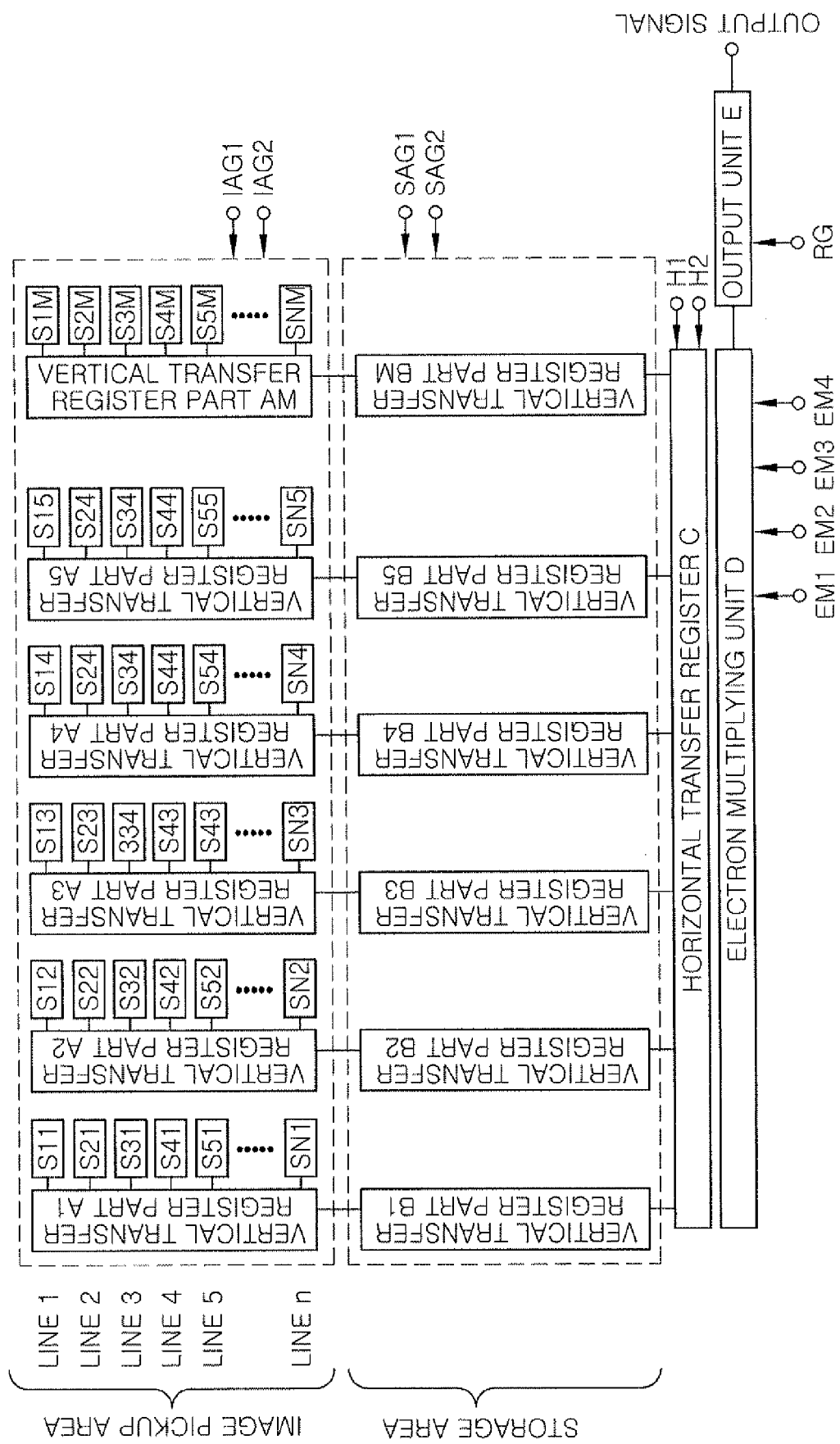
FIG. 3 is a view for explaining a pixel array of a charge coupled device in accordance with the embodiment of the present invention.

FIG. 3 is a diagram for explaining major parts of the EM-CCD 3 shown in FIG. 1. The EM-CCD 3 mainly includes an image pickup area, a storage area, a horizontal transfer register C, an electron multiplying unit D and an output unit E.

Since the EM-CCD 3 has the image pickup area and the storage area, the EM-CCD 3 is of a frame interline transfer type called as an FIT type.

The image pickup area includes a plurality of pixels S11 to SNM for receiving and photoelectrically converting the incident light and M columns of vertical transfer register parts A1 to AM, and the control is performed by signals IAG1 and IAG2. The image pickup area of FIG. 3 shows the pixel array, wherein one square indicates one pixel and a numeral Sij written in the square indicates a layout of the pixel. That is, i ($i=1, \ldots, N$) indicates the row and j ($j=1, \ldots, M$) indicates the column.

The vertical transfer registers of the charge coupled device shown in FIG. 3 are divided into the image pickup area and the storage area. In the image pickup area, the pixels of the first row are arranged in the order of S11, S12, S13, S14, S15, ..., and S1M, the pixels of the second row are arranged in the order of S21, S22, S23, S24, S25, ..., and S2M, the pixels of the third row are arranged in the order of S31, S32, S33, S34, S35, ..., and S3M, and the pixels of the $N^{th}$ row are arranged in the order of SN1, SN2, SN3, SN4, SN5, ..., and SNM. Here, M and N are natural numbers. Further, the signals of pixels are read in the same order as that of the aforementioned pixel array. To be specific, the signals are read out in the order of S11, S12, S13, ..., and SNM. The storage area is formed of M columns of vertical transfer register parts B1 to BM, and the control is performed by signals SAG1 and SAG2.

The horizontal transfer register C reads image signals transferred from the vertical transfer register parts B1 to BM of the storage area on a pixel by pixel basis, and the control is carried out by signals H1 and H2. The electron multiplying unit D performs the electron multiplication of the image signals outputted from the horizontal transfer register C, and the control is performed by signals EM1 to EM4. The output unit E outputs the image signals to the outside of the EM-CCD 3, and a signal RG resets the output unit E to generate a reset level.

In the embodiment of the present invention, the image signals and the smear signals are read out by the charge coupled device shown in FIG. 3 on a field or frame unit basis. The smear signals are generated when the vertical transfer register in the image pickup area is exposed to the incident light of high illuminance. Therefore, only the smear signals generated in the vertical transfer register is read by driving the charge coupled device such that the smear signals are read from predetermined lines in the storage area that are vertically transferred in advance without using the signals from the pixel obtained in the image pickup area. By means of this charge coupled device driving method, it is possible to reduce noises such as smears and the like outputted from the charge coupled device regardless of pixel defects which are latently included in the light-shielded optical black.

Figure 4:
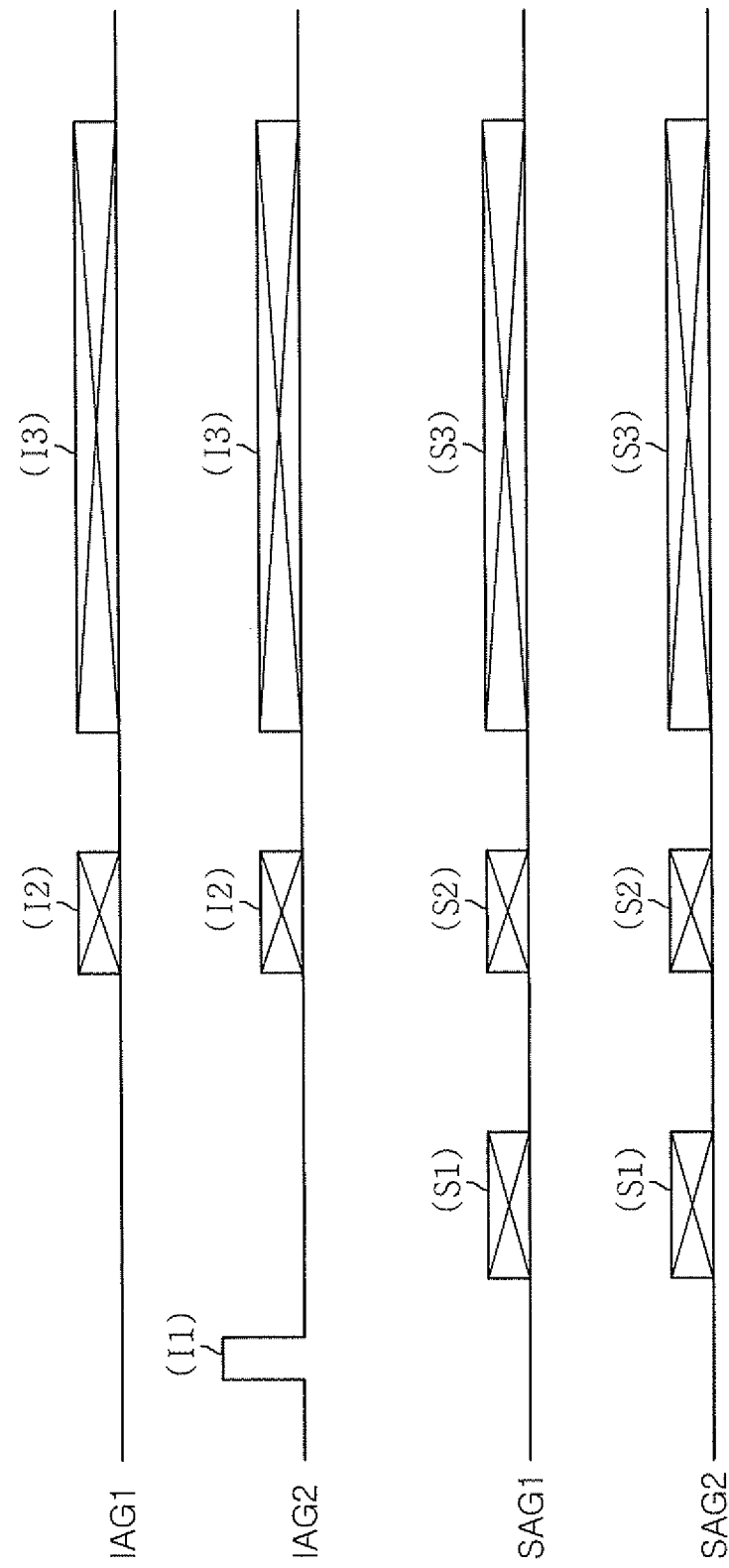
FIG. 4 is a timing chart for explaining a method of driving the charge coupled device.
Figure 5:
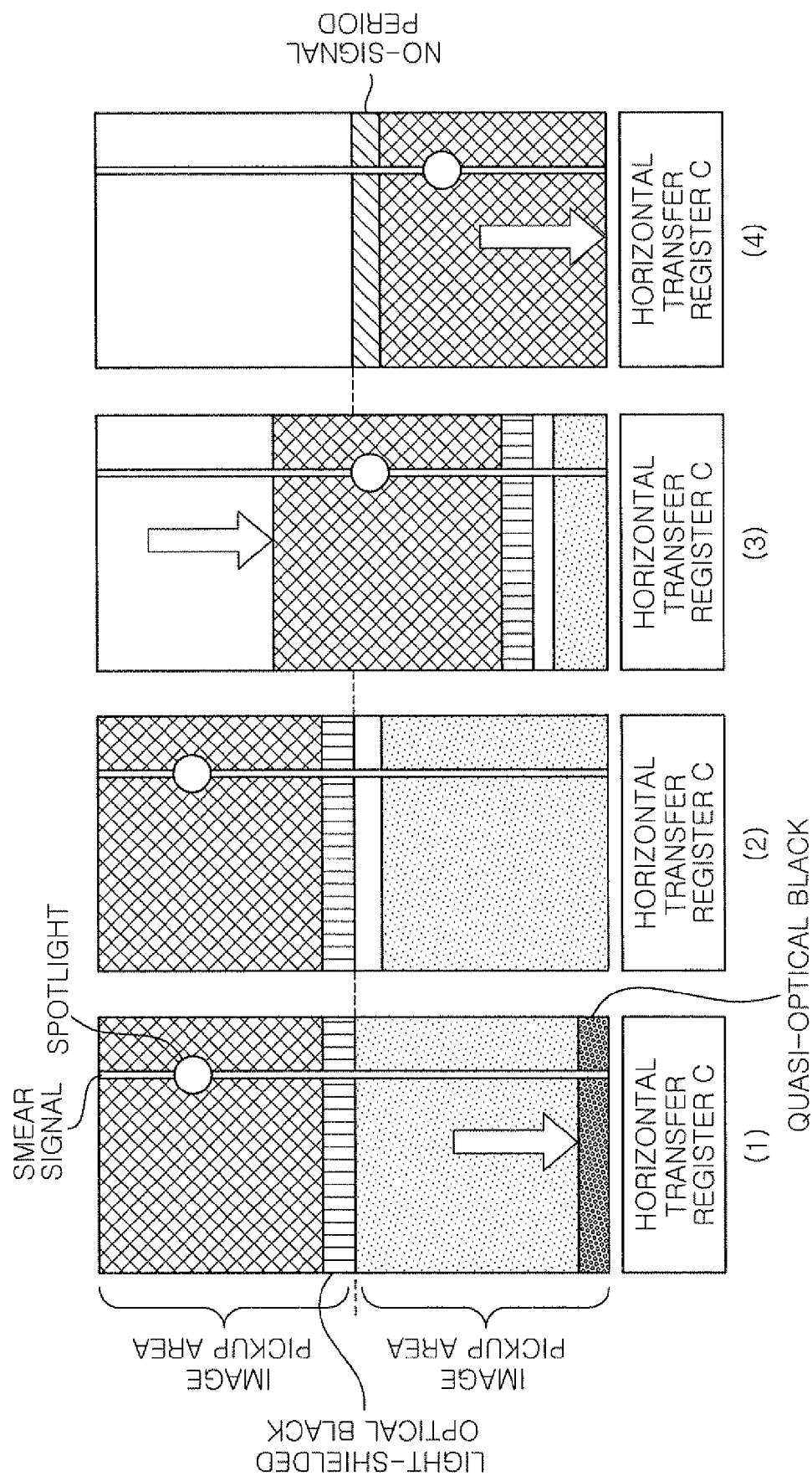
FIG. 5 shows how a smear signal and an image signal of the charging coupled device are vertically transferred in an image pickup area and a storage area.

Next, a method of driving the charge coupled device to vertically transfer a predetermined number of lines in the storage area shown in FIG. 3, serving as a quasi-optical black area, and to read smear signals therefrom will be described with reference to FIGS. 3 to 5. FIG. 4 is a timing chart for explaining a method of driving the charge coupled device, and FIG. 5 shows how a smear signal and an image signal of the charging coupled device are vertically transferred in an image pickup area and a storage area. Herein, it is assumed that the total number of lines (the number of scanning lines) is 525, the number of lines in the image pickup area is 500, the number of lines in the light-shielded optical black area is 4 the first to the fourth line, and progressive scanning is used.

The EM-CCD 3 typically reads out signals of a pixel obtained in the image pickup area to the vertical transfer register parts A1 to AM and sends the signals of the pixels of 500 lines to the storage area by high-speed vertical-transfer from the vertical transfer register parts A1 to AM to the vertical transfer register parts B1 to BM. Then, the EM-CCD 3 sends the signals from the vertical transfer register parts B1 to BM to the horizontal transfer register C by typical vertical-transfer to read the signals from the pixel of 500 lines.

In the present embodiment, the lines in the storage area that have been transferred in advance become signal lines of a black level, i.e., a quasi-optical black area, thereby having no signals of the pixel by controlling a predetermined line number (e.g., 4 that is identical to that of the light-shielded optical black in the present embodiment) of the storage area (having 500 lines) to be typically vertical-transferred by the vertical transfer pulse in advance; the lines more than the line number of the image pickup area by a predetermined line number (500+4 lines) to be high-speed vertical-transferred; and the lines less than the line number of the storage area by a predetermined line number (500−4 lines: those having signals from the pixels) to be typically vertical-transferred. Accordingly, it is possible to output only the smear signals generated when imaging the incident light of high illuminance. That is, without outputting the smear signals from the light-shielded optical black of the EM-CCD 3, it is possible to make the quasi-optical black area by controlling the vertical transfer.

Moreover, the reason that the lines more than the line number of the image pickup area by 4 lines are high-speed vertical-transferred is because an image signal can be corrected by use of the smear signals obtained from the quasi-optical black period by canceling the signals of the lines in the light-shielded optical black area (without using them as image signals) and by taking lines having the signals of the pixel from the lines read out to the horizontal transfer register C subsequently.

Specifically, the EM-CCD 3 transfers image signals from the pixels in the image pickup area by the signals IAG1 and IAG2 to the vertical transfer register parts A1 to AM.

The EM-CCD 3 typically vertical-transfers only the 4 lines of the quasi-optical black area in the storage area by the signals SAG1 and SAG2r. Further, the EM-CCD 3 vertical-transfers the signals from the pixels of the vertical transfer register parts A1 to AM at high-speed to the vertical transfer register B1 to BM by the signals SAG1 and SAG2. Accordingly, the EM-CCD 3 high-speed vertical-transfers the 504 lines added with 4 lines (of the quasi-optical black period of the storage area that have been transferred in advance), and signals of the first to the fourth line of the light-shielded optical black period of the image pickup area are not read out by the horizontal transfer register C and skipped. The EM-CCD 3 transfers 496 lines having signals from the pixels (image signals having signals from the pixels of the first to the $496^{th}$ line: first image signal) from the vertical transfer register parts B1 to BM to the horizontal transfer register C by the signals SAG1 and SAG2 to be read out. In other words, signals of the first to the $500^{th}$ line of the image pickup area are ordinarily transferred to the horizontal transfer register C to be read out; however, in the present embodiment, the signals of the fifth to the $500^{th}$ line of the image pickup area, serving as effective pixel areas, are transferred to the horizontal transfer register C to be read out, and the 4 lines, having a no-signal period, of the 504 lines added with the 4 lines that have been high speed vertical-transferred are not transferred to the horizontal transfer register C. Accordingly, the pre-read 4-line area of the storage area serves as the quasi-optical black area and, thus, it is possible to output only the smear signals generated when imaging the incident light of high illuminance (i.e., signals of the quasi-optical black area having only the smear signals with no signal from the pixel: second image signal). By performing such driving of the vertical transfer register parts, it is possible to obtain only the smear signals regardless of pixel defects which are latently included in the light-shielded optical black of the EM-CCD 3. Further, such processes are carried out during the vertical blanking period.

The timing chart shown in FIG. 4 will be described. In pulse I1, the EM-CCD 3 reads out the signals from the pixels to the vertical transfer register parts A. In pulse S1, four lines of the vertical transfer register parts B are typically transferred. Here, the EM-CCD 3 outputs pure smear signals included in the 4 lines to the smear correction unit 7. In pulse I2, the EM-CCD 3 vertical-transfers the signals from the pixels of the 504 lines at high-speed from the vertical transfer register parts A (A1 to AM) to the vertical transfer register parts B (B1 to BM). In pulse S2, the EM-CCD 3 high-speed vertical-transfers the signals of the 504 lines from the vertical transfer register parts B to the horizontal transfer register C. At this time, the signals from the storage area high-speed vertical-transferred are not read out to a rear portion of the horizontal transfer register C. In pulse I3, the EM-CCD 3 typically vertical-transfers the signals from the pixels of the 496 lines from the vertical transfer register parts A to the vertical transfer register parts B. In pulse S3, the EM-CCD 3 typically vertical-transfers the 496 lines having the signals from the pixels from the vertical transfer register parts B to the horizontal transfer register C. With reference to FIG. 5, how a smear signal and an image signal of the EM-CCD 3 are vertically transferred in an image pickup area and a storage area will be described. In (1) of FIG. 5, by pulse I1, the EM-CCD 3 reads out the signals from the pixels obtained from the image pickup area and, then, typically transfers the 4 lines of the storage area. In (2) of FIG. 5, the state after the 4 lines of the storage area are typically transferred is shown. In (3) of FIG. 5, by pulse I2, the EM-CCD 3 high-speed vertical transfers the signals from the pixels of 504 lines from the image pickup area to the storage area. In (4) of FIG. 5, by pulse S3, the EM-CCD 3 typically vertical transfers the signals from the pixels of 496 lines from the storage area to the horizontal transfer register C. In the present embodiment, between (1) and (2), the smear signals are read out from the quasi-optical black periods of the storage area.

Even though each of the vertical transfer register parts A1 to AM and B1 to BM has been described as being controlled by two-phase control signals in the present embodiment, it may be controlled by four-phase control signals or the like. Further, although the embodiment has been described with respect to the progressive scanning, interlaced scanning may also be used.

Besides, in the present embodiment, the predetermined line number of the storage area vertical-transferred in advance is set to be 4, which is identical to that of the light-shielded optical black period. Since, however, the number of lines in the light-shielded optical black area varies with the charge coupled device, the line number is not limited to 4. If more lines than that of the light-shielded optical black period area are vertically transferred in advance, the number of lines to be averaged is increased, thereby improving the smear correction accuracy, but decreasing the number of effective pixels capable of being photographed. On the other hand, if fewer lines than that of the light-shielded optical black period area are vertically transferred in advance, the number of lines to be averaged is decreased, which deteriorates the smear correction accuracy. However, if such effect is considered, the line number may be more or less than that of the light-shielded optical black period area.

Operations of detection and correction of the smear signals will now be described with reference to FIG. 2.

First, from the signal A inputted to the smear correction unit 7 in FIG. 2, signals from pixels of the first line to the fourth line of the quasi-optical black area are respectively stored in memory units 701-1 to 701-4 shown in FIG. 2, while a signal from a pixel of an $n^{th}$ line of the quasi-optical black is stored in a memory unit 701-$n$. In the present embodiment, the memory units 701-1 to 701-4 are used as the quasi-optical black area has 4 lines.

The signals stored in the memory units 701-1 to 701-$n$ are outputted whenever the signals from the pixels in the image pickup area are read out. The storage and output of the memory units 701-1 to 701-$n$ are controlled by a signal "a", that is outputted from the control unit 715. The signals outputted from the memory units 701-1 to 701-$n$ are summed by the adder 702 and multiplied by ¼ time by the 1/n unit 703. The average of the signals for each column of lines in the predetermined smear signal detection area can be performed by the memory units 701-1 to 701-$n$, the adder 702 and the 1/n unit 703. With reference to FIG. 3, the inter-line averaging refers to a process for adding the signals of, e.g., the first column of the line S11, the first column of the line S21, the first column of the line S31, and the first column of the line S41, and multiplying the added signal by 1/n time. In this manner, the averaging process for each line is performed in order of the second columns of the lines S11 to S1M, the third columns of the lines S11 to S1M, . . . , and the $M^{th}$ column of the lines S11 to S1M.

Subsequently, high-frequency components are removed from the inter-line averaged signals by a low pass filter formed of the delay units 704 and 705, the multiplier units 706 to 708 and the adder 709. The signal "b" outputted from the control unit 715 determines the characteristics of the low pass filter.

The high-level suppression unit 710 performs a non-linear process on the signal of a predetermined level or higher as shown in FIG. 8, which is outputted from the adder 709. In the present embodiment, assuming that a level of the smear signal is 100% (0.1 V in FIG. 6) when the image signal outputted from the EM-CCD 3 is saturated (1.0 V in FIG. 6), the non-linear process is performed on the input signal whose smear signal level is 90% or higher by the high-level suppression unit 710. Further, clipping is performed on the input signal whose smear signal level is equal to or greater than 110%. The non-linear process of the high-level suppression unit 710 is controlled by the signal "d" outputted from the control unit 715. The smear correction can be prevented from becoming overcorrected by the non-linear process even when the image signal is saturated.

Further, the low-level suppression unit 711 performs a non-linear process on the signal of a predetermined level or lower as shown in FIG. 8, that is outputted from the high-level suppression unit 710. In the present embodiment, assuming that a level of the smear signal is 100% (0.1 V in FIG. 6) when the image signal outputted from the EM-CCD 3 is saturated (1.0 V in FIG. 6), the non-linear process is performed on the input signal whose smear signal level is equal to or less than 10% by the low-level suppression unit 711. The non-linear process of the low-level suppression unit 711 is controlled by the signal "e" that is outputted from the control unit 715. Due to this non-linear process, random noises from the optical black area are not subtracted from random noises in the image pickup area, thereby making it possible to naturally perform the smear correction.

The signal outputted from the low-level suppression unit 711 is inputted to the switching unit 712. The switching unit 712 is controlled by the signal outputted from the comparison unit 713. The comparison unit 713 compares the level of the signal outputted from the adder 709 with that of the signal "c" outputted from the control unit 715. If the level of the signal "c" is equal to or lower than that of the signal outputted from the adder 709, the comparison unit 713 controls the switching unit 712 such that the signal outputted from the low-level suppression unit 711 is outputted as the signal "g" from the switching unit 712. On the other hand, if the level of the signal "c" is higher than that of the signal outputted from the adder 709 as a comparison result of the comparison unit 713, the comparison unit 713 controls the switching unit 712 such that the signal "f" outputted from the control unit 715 is outputted as the signal "g" from the switching unit 712. The signal "f" may be set to be zero or a predetermined value.

The comparison unit 713 compares a level of the smear correction signal with that of a rated signal outputted from the image signal output unit 9. If the smear correction signal level is equal to or higher than, e.g., 10% of the rated signal level, the smear correction signal of 10% or more is subtracted from the image signal of 100% to provide the image signal of 90% or less. That is, the comparison unit 713 and the switching unit 712 prevent the smear correction signal from exerting an influence on the image signal itself.

The subtractor 714 subtracts the signal "g", i.e., the smear correction signal, from the signal A, and outputs the resultant signal of the subtraction as a signal L.

Operations of detection and correction of the smear signal outputted from the EM-CCD 3 in accordance with another embodiment of the present invention will be described hereinafter with reference to FIGS. 2 and 9.

Figure 9:
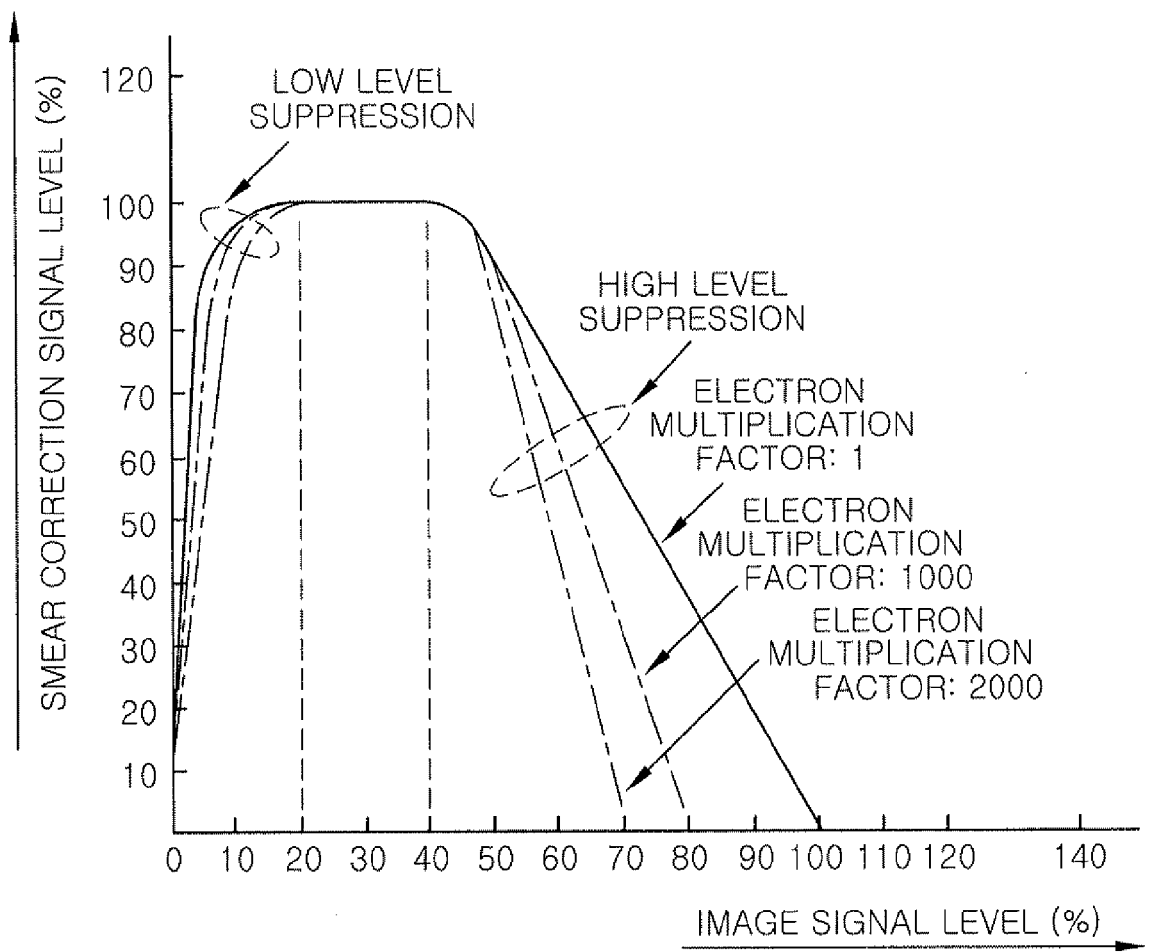
FIG. 9 is a view for explaining low-level and high-level suppressions of a smear correction with respect to an image signal level in accordance with another embodiment of the present invention.

FIG. 9 is a view for explaining low-level and high-level suppressions of the smear correction signal in accordance with another embodiment of the present invention. Referring to FIG. 2, the description of the same operation as that in the aforementioned embodiment will be omitted.

If the electron multiplication factor of the EM-CCD 3 is set to 1000 times and a high-luminance object like a spotlight is photographed, the smear signal is also immediately saturated, as shown in FIG. 7. In accordance with the another embodiment of the present invention, the characteristics of the high-level suppression unit 710 and the low-level suppression unit 711 are modified based on the electron multiplication factor of the EM-CCD 3 and the image signal level of the signal A. The level of the smear signal outputted from the adder 709 is set as 100%. A rated image signal level of the signal A is set as 100%.

In. FIG. 9, the horizontal axis indicates an image signal level outputted from the image signal level detector 716 (unit: percentage (%)), and the vertical axis indicates a smear correction signal level outputted from the low-level suppression unit 711 (unit: percentage (%)).

An operation of the high-suppression unit 710 will now be described. In the case when the electron multiplication factor of the EM-CCD 3 is 1, if the image signal level reaches 40%, the level of the smear correction signal outputted from the high-level suppression unit 710 starts to be reduced. When the image signal level becomes equal to or higher than 100%, the smear correction signal level is set to zero or cut-off. If the electron multiplication factor of the EM-CCD 3 is 1000, the level of the smear correction signal outputted from the high-level suppression unit 710 starts to decrease as the image signal level reaches 40%. When the image signal level becomes equal to or higher than 80%, the smear correction signal level is set to zero or cut-off.

Further, if the electron multiplication factor of the EM-CCD 3 is 2000, the level of the smear correction signal outputted from the high-level suppression unit 710 is reduced as the image signal level reaches 40%. When the image signal level becomes equal to or higher than 70%, the smear correction signal level is set to zero or cut-off. That is, the characteristics of the smear correction signal level are changed depending on the electron multiplication factor of the EM-CCD 3 and the image signal level of the signal A. By providing the high-level suppression unit 710 with such characteristics, it is possible to adequately perform the smear correction based on the electron multiplication factor of the EM-CCD 3 and the image signal level of the signal A.

An operation of the low-suppression unit 711 will be now described. If the electron multiplication factor of the EM-CCD 3 is 1, the level of the smear correction signal of the low-level suppression unit 711 starts to increase when the image signal level is 0%. If the image signal level becomes equal to or higher than 20%, the smear correction signal level is set to 100%. If the electron multiplication factor of the EM-CCD 3 is 1000, the level of the smear correction signal of the low-level suppression unit 711 starts to increase when the image signal level is 0%. If the image signal level becomes equal to or higher than 20%, the smear correction signal level is set to 100%.

Further, if the electron multiplication factor of the EM-CCD 3 is 2000, the level of the smear correction signal of the low-level suppression unit 711 starts to increase when the image signal level is 0%. If the image signal level becomes equal to or higher than 20%, the smear correction signal level is set to 100%. That is, the smear correction signal level is changed depending on the electron multiplication factor of the EM-CCD 3 and the image signal level of the signal A. By providing the low-level suppression unit 711 with such characteristics, it is possible to perform the adequate smear correction with reduced noise based on the electron multiplication factor of the EM-CCD 3 and the image signal level of the signal A.

Although the adder 709, the high-level suppression unit 710 and the low-level suppression unit 711 are arranged in that order in the aforementioned embodiments, the adder 709, the low-level suppression unit 711 and the high-level suppression unit 710 may be arranged in that order. Further, the high-level suppression unit 710 and the low-level suppression unit 711 can also have an amplifying function for level matching. If the amplifying function is provided, an amplification factor is controlled by the control unit 715.

In accordance with still another embodiment of the present invention, the smear correction unit 7 shown in FIG. 1 may detect and correct the smear signal by using a microprocessor such as a CPU (Central Processing Unit) or the like. An example of the operation for detecting and correcting the smear signal in accordance with the present embodiment will be described with reference to FIGS. 10A and 10B.

Figure 10A:
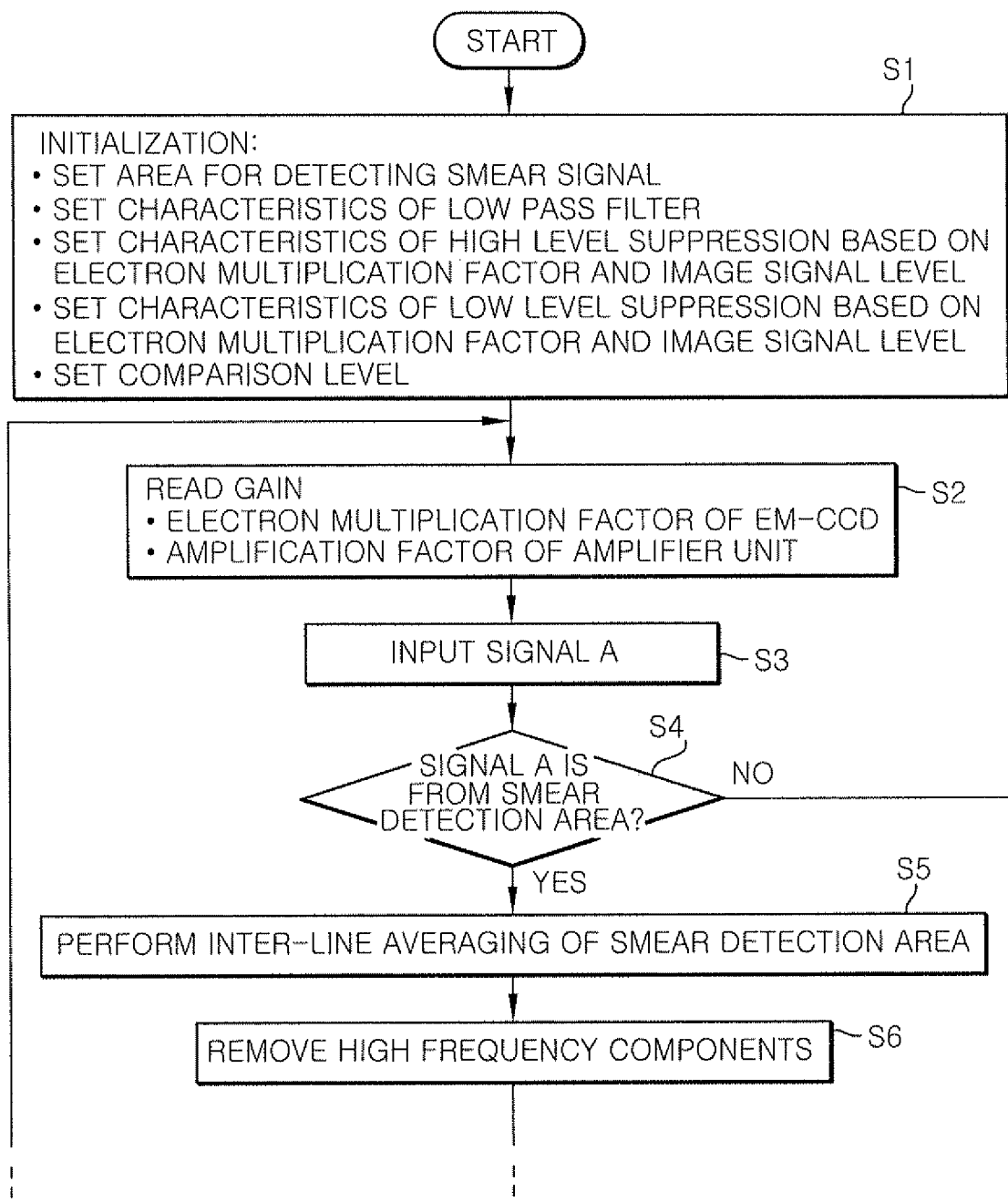
FIGS. 10A and 10B are a flowchart for explaining operations of smear signal detection and smear correction in accordance with still another embodiment of the present invention.
Figure 10B:
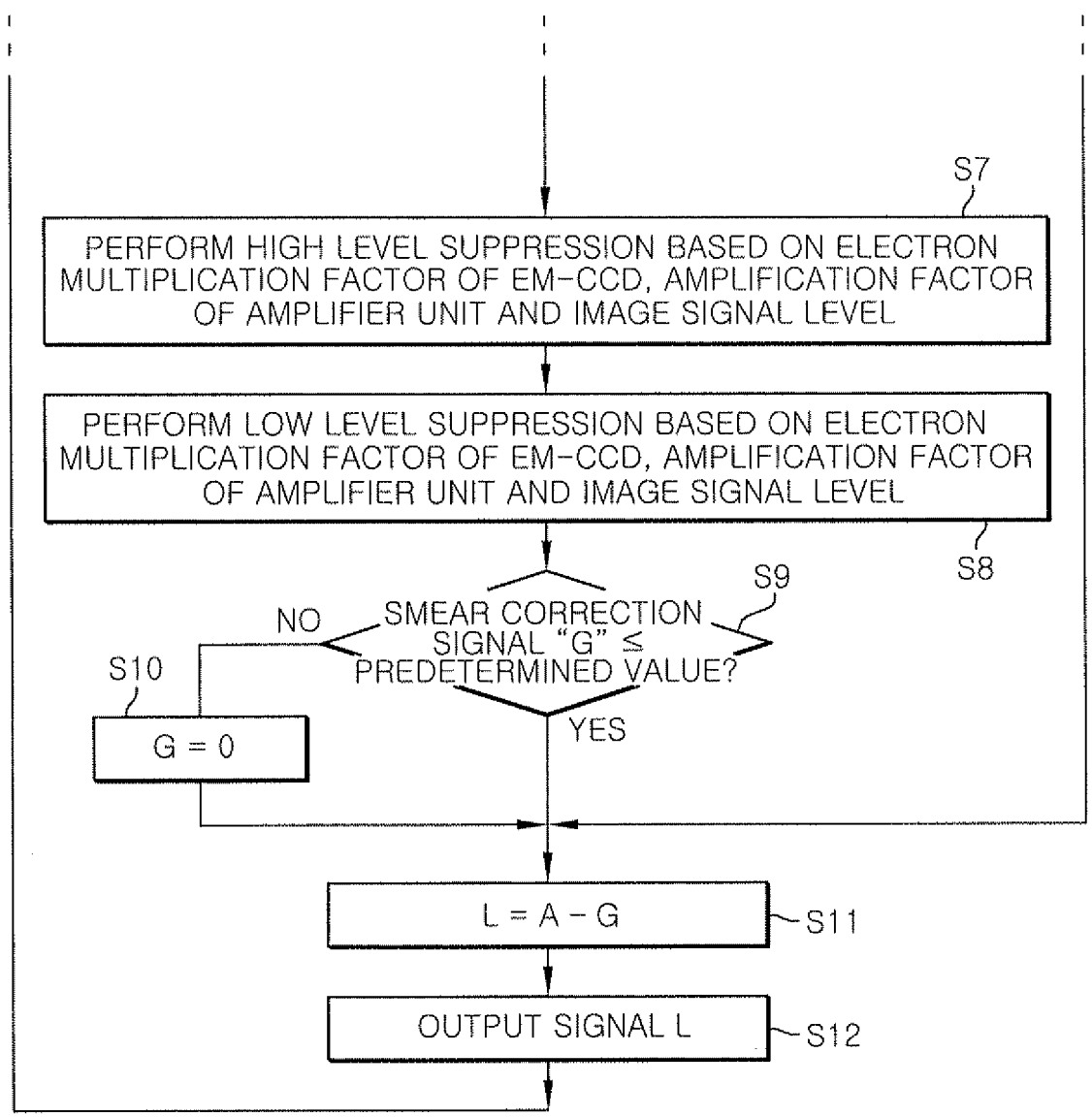

FIGS. 10A and 10B are a flowchart for explaining operations for the detection of the smear signal and the smear correction in accordance with the present embodiment of the present invention.

In step S1 shown in FIGS. 10A and 10B, initial settings are made for the smear signal detection area in the image pickup area of the EM-CCD 3; low pass filter characteristics; high-level suppression characteristics based on the electron multiplication factor and the image signal level; low-level suppression characteristics based on the electron multiplication factor and the image signal level; and a comparison level. In step S2, the electron multiplication factor of the EM-CCD 3 and the amplification factor of the amplifier unit 5 are read out from the CPU 11. In step S3, the signal A is inputted. In step S4, it is determined whether or not the signal A is a signal from the smear detection area. If the signal A is the signal from the smear detection area, the process proceeds to step S5. If otherwise, step S11 follows.

In step S5, the inter-line averaging process of the signals from the smear detection area is performed and the process proceeds to step S6. In step S6, high-frequency components are eliminated by the low pass filter, and step S7 follows. In step S7, the high-level suppression process is carried out based on the electron multiplication factor of the EM-CCD 3, the amplification factor of the amplifier unit 5 and the image signal level, and step S8 follows. In step S8, the low-level suppression process is performed based on the electron multiplication factor of the EM-CCD 3, the amplification factor of the amplifier unit 5 and the image signal level, and the process proceeds to step S9.

In step S9, the level of the smear correction signal "g", i.e., the signal processed up to step S8 is compared with the initially set comparison level. If it is equal to or less than the comparison level, step S11 follows. If otherwise, the process proceeds to step S10. In step S10, the smear correction signal "g" is set to zero or cut-off and step S11 then follows. In step S11, the smear correction signal "g" is subtracted from the signal A, and step S12 follows. In step S12, the signal L is outputted.

Although the value calculated by inter-line averaging the obtained smear signal is used in the above embodiments, a central value of the obtained smear signal may be used with the same effect.

As described above, in accordance with the present invention, by vertical-transferring only the predetermined line number of the storage area of the charge coupled device in advance, the smear signal is obtained from the predetermined lines as the quasi-optical black area, and the high-level suppressions are performed on the obtained smear signal based on the image signal level of the predetermined pixels. Further, the suppressed smear signal is subtracted from the image signal level. Therefore, it is possible to reduce noises such as smears and the like outputted from the charge coupled device regardless of pixel defects which are latently included in the light-shielded optical black.

Although the present invention has been described in detail above, it is not limited to the image pickup device disclosed herein, but may be widely applied to various image pickup devices other than the above-described device.

While the invention has been shown and described with respect to the embodiments, it will be understood by those skilled in the art that various changes and modifications may be made without departing from the scope of the invention as defined in the following claims.

What is claimed is:
1. An image pickup device, comprising:
 a charge coupled device having an image pickup area and a storage area;
 a control unit for vertical-transferring signals of a predetermined line number that have no pixel signal from a vertical transfer register of the storage area and vertical-transferring more lines than the number of lines of a vertical transfer register of the image pickup area by the predetermined line number to the vertical transfer register of the storage area during a vertical blanking period;
 an image signal obtaining unit for obtaining image signals outputted from predetermined pixels of the charge coupled device as a first image signal;

an obtaining unit for obtaining the signals of the predetermined line number that have no pixel signal of the storage area as a second image signal; and a correction unit for subtracting a value corresponding to the second image signal obtained by the obtaining unit from the first image signal obtained by the image signal obtaining unit, wherein the control unit typically vertical-transfers the signals of the predetermined line number that have no pixel signal, and wherein after typically vertical-transferring the signals of the predetermined line number that have no pixel signal, the control unit vertical transfers more lines than the number of lines of a vertical transfer register of the image pickup area by the predetermined line number to the vertical transfer register of the storage area.

2. The image pickup device of claim 1, wherein the control unit high-speed vertical transfers more lines than the number of lines of a vertical transfer register of the image pickup area by the predetermined line number to the vertical transfer register of the storage area.

3. The image pickup device of claim 2, wherein the predetermined line number is identical to the number of lines of a light-shield optical black area.

4. The image pickup device of claim 3, further comprising:
a calculation unit for calculating an inter-line average value or an inter-line central value of the second image signal obtained by the obtaining unit;
a suppression unit for performing a high-level suppression on the signal calculated by the calculation unit; and
a subtractor for subtracting the signal suppressed by the suppression unit from the first image signal obtained by the image signal obtaining unit.

5. The image pickup device of claim 4, further comprising:
a comparison unit for comparing the second image signal calculated by the calculation unit with a predetermined level; and
a switching unit for cutting off an output of the suppression unit depending on a comparison result of the comparison unit.

6. A noise reduction method of an image pickup device including a charge coupled device having an image pickup area and a storage area, the method comprising:
vertical-transferring signals of a predetermined line number that have no pixel signal from a vertical transfer register of the storage area and vertical-transferring more lines than the number of lines of a vertical transfer register of the image pickup area by the predetermined line number to the vertical transfer register of the storage area during a vertical blanking period;
obtaining image signals outputted from predetermined pixels of the charge coupled device as a first image signal;
obtaining the signals of the predetermined line number that have no pixel signal of the storage area as a second image signal; and
subtracting a value corresponding to the second image signal obtained by the obtaining unit from the first image signal obtained by the image signal obtaining unit,
wherein the signals of the predetermined line number that have no pixel signal are typically vertical-transferred from the vertical transfer register of the storage area, and
wherein after typically vertical-transferring the signals of the predetermined line number that have no pixel signal, more lines than the number of lines of a vertical transfer register of the image pickup area by the predetermined line number are vertical-transferred to the vertical transfer register of the storage area.

7. The noise reduction method of claim 6, wherein more lines than the number of lines of a vertical transfer register of the image pickup area by the predetermined line number are high-speed vertical transferred to the vertical transfer register of the storage area.

8. The noise reduction method of claim 7, wherein the predetermined line number is identical to the number of lines of a light-shield optical black area.

9. The noise reduction method of claim 8, further comprising:
calculating an inter-line average value or an inter-line central value of the second image signal;
performing a high-level suppression on the calculated signal depending on an electron multiplication factor of the charge coupled device; and
subtracting the suppressed signal from the first image signal.

10. The noise reduction method of claim 9, further comprising:
comparing the second image signal with a predetermined level; and
cutting off the suppressed signal depending on a comparison result.

* * * * *